Dec. 12, 1933.  F. M. CARROLL  1,939,040
SPLIT AUTOMATIC CONTROL SYSTEM
Filed Oct. 25, 1927  8 Sheets-Sheet 1
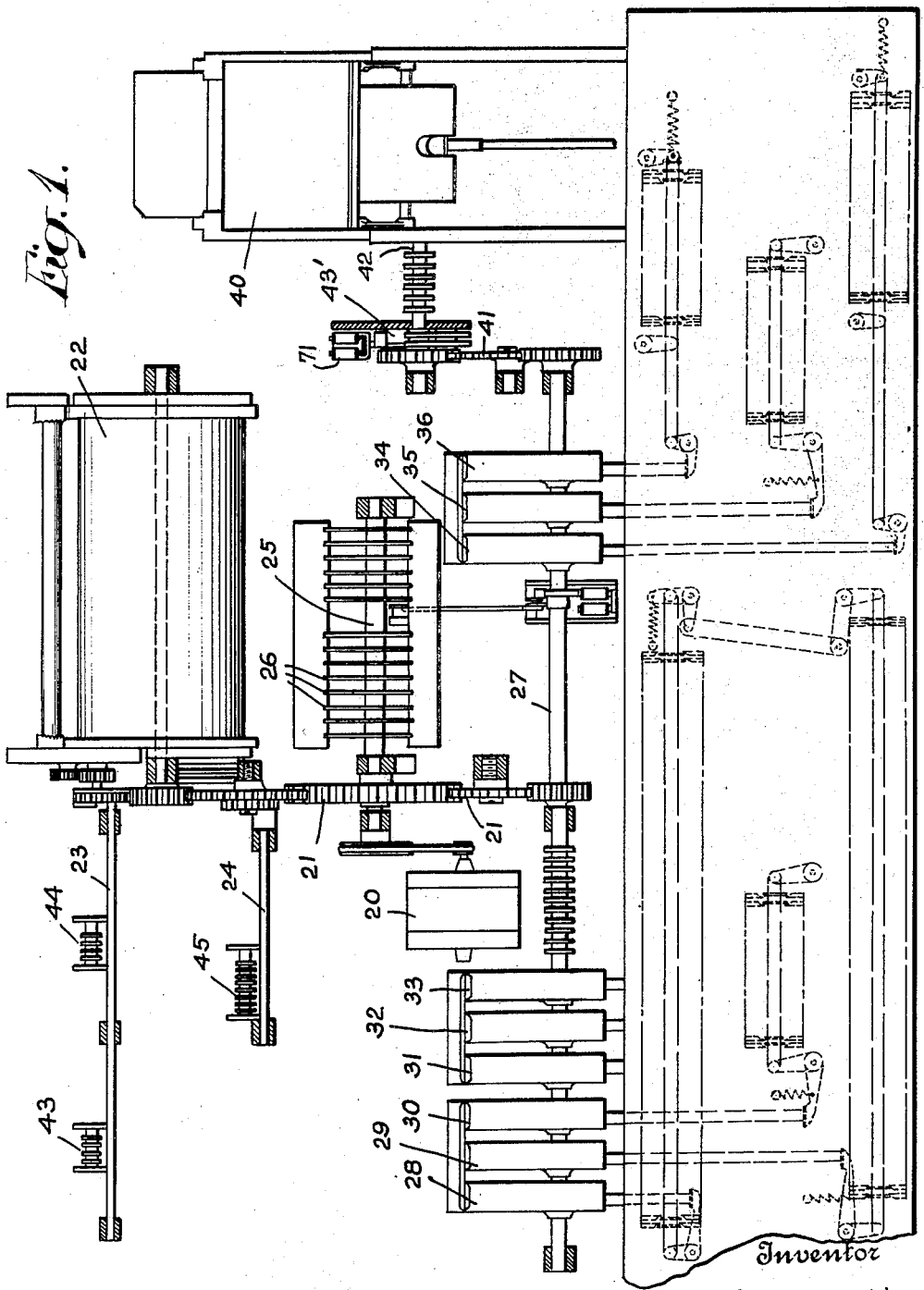
Inventor
Fred M. Carroll
By his Attorney

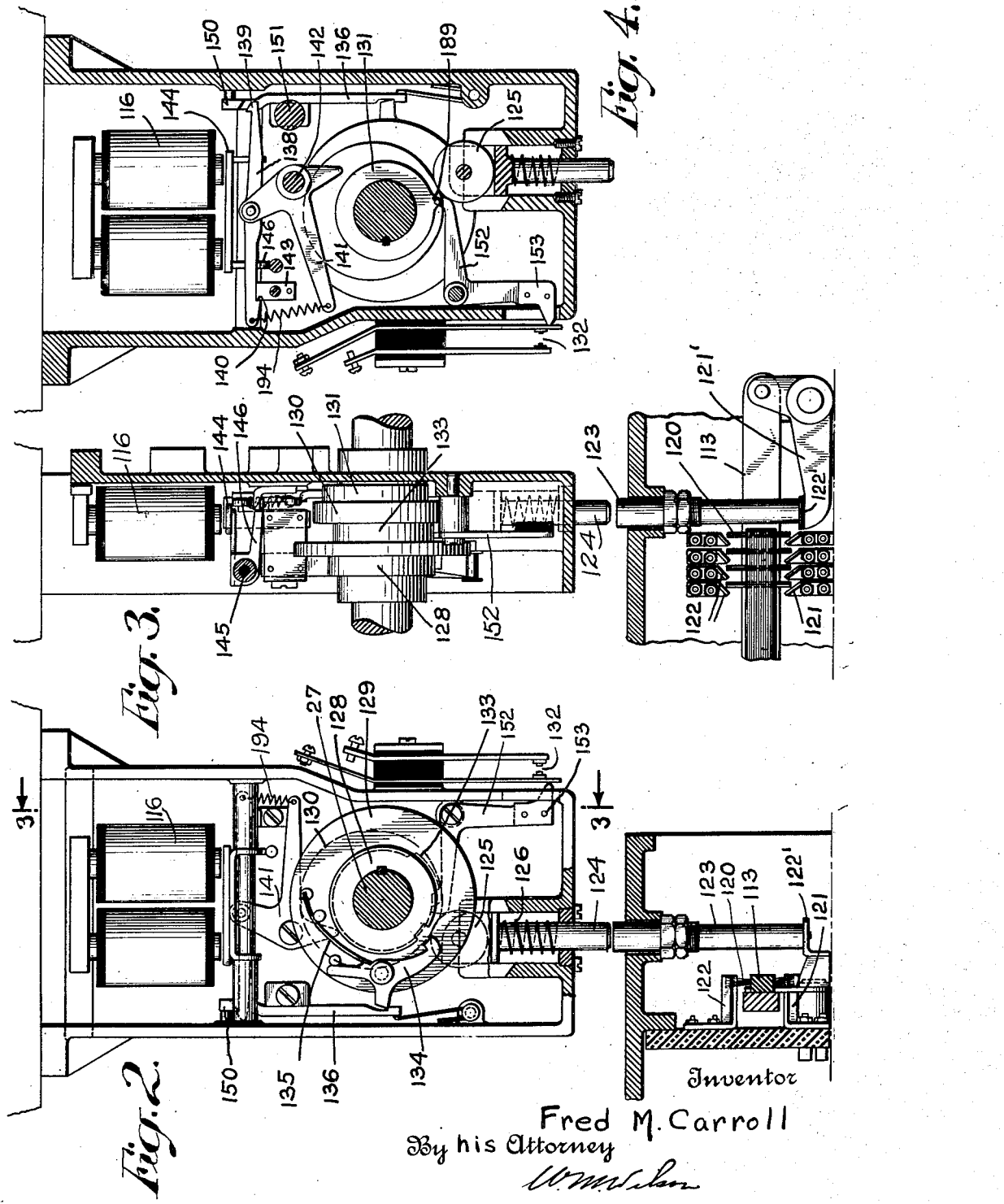

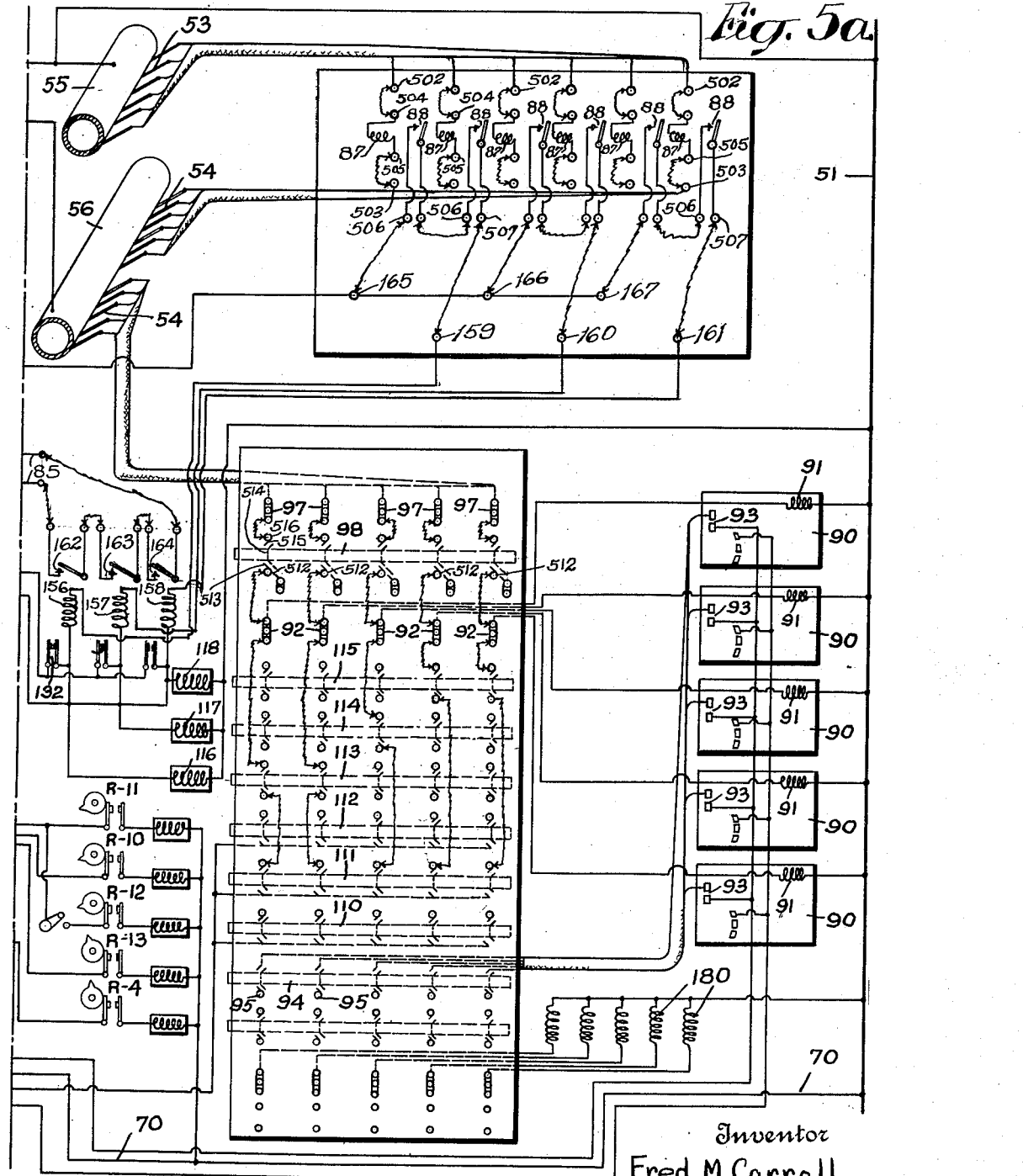

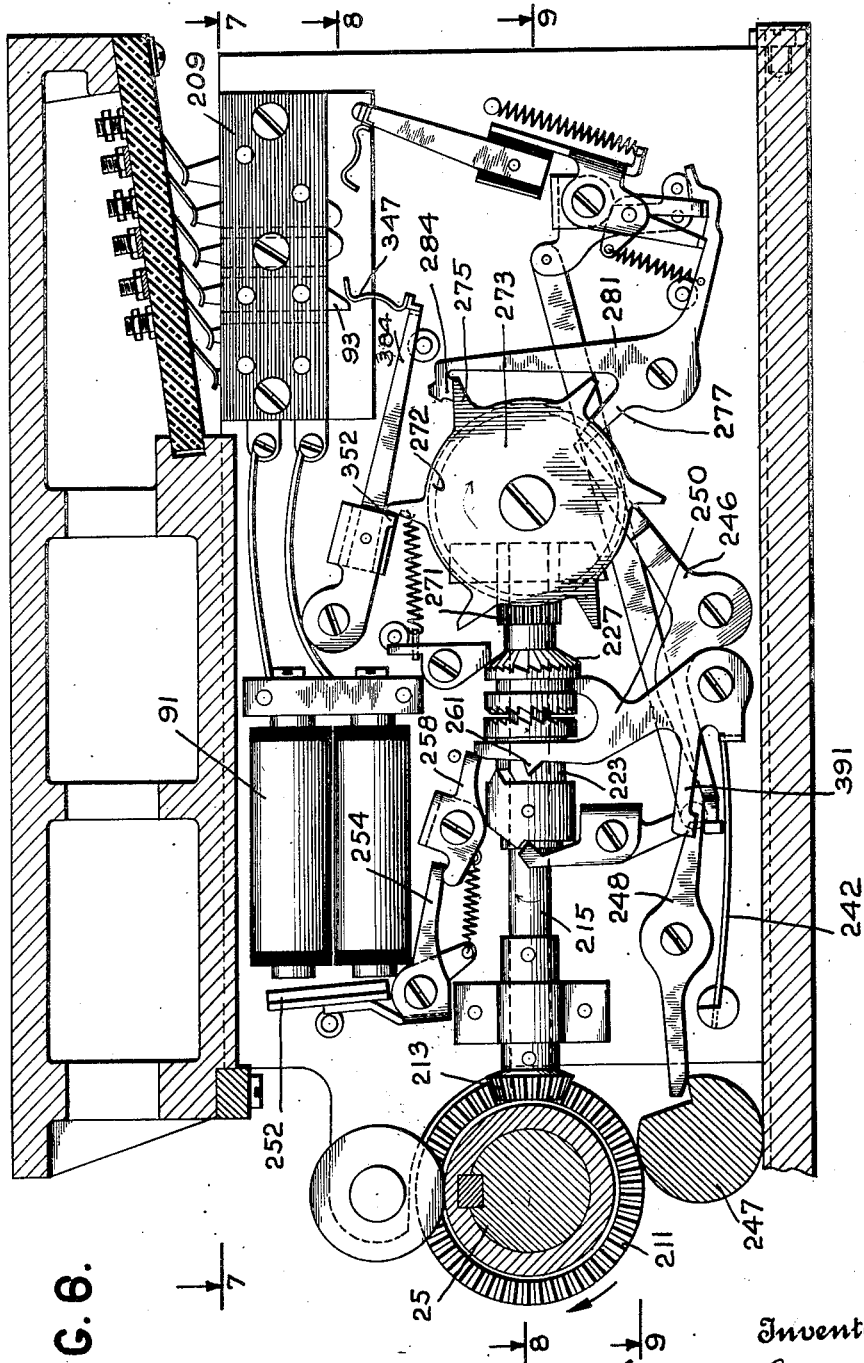

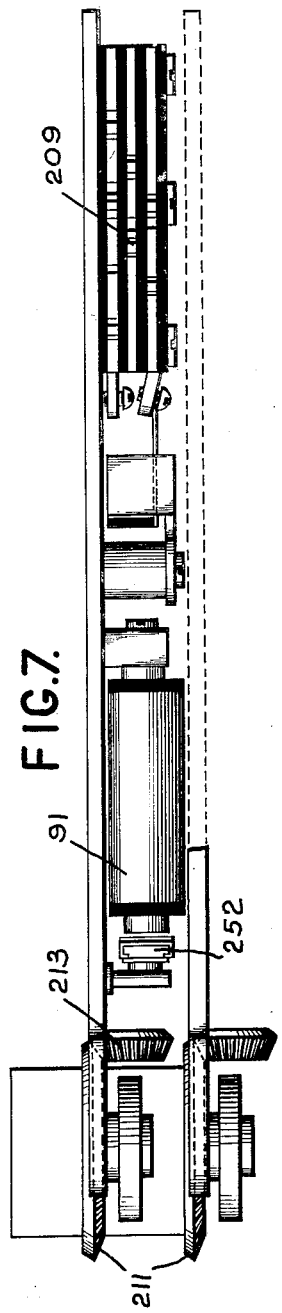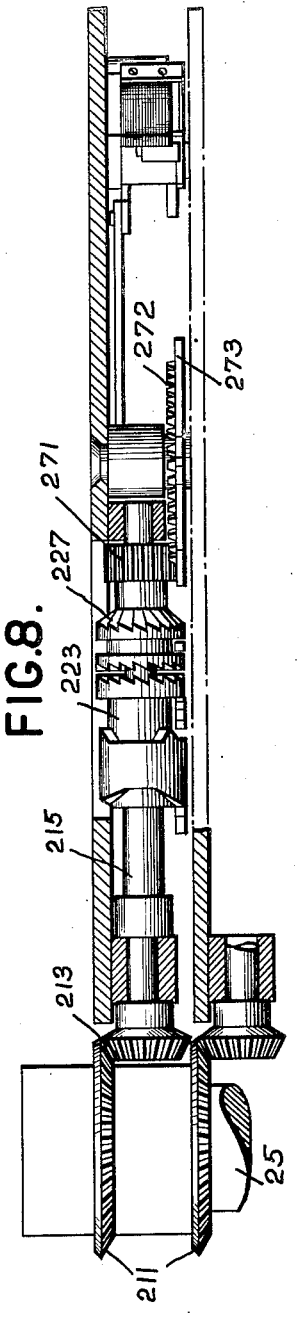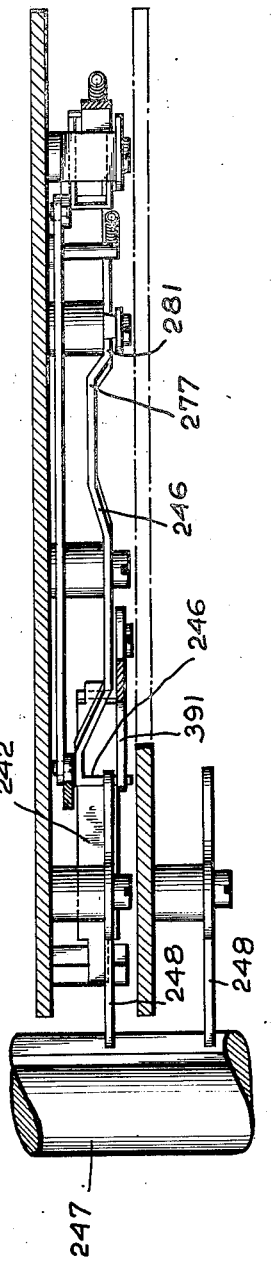

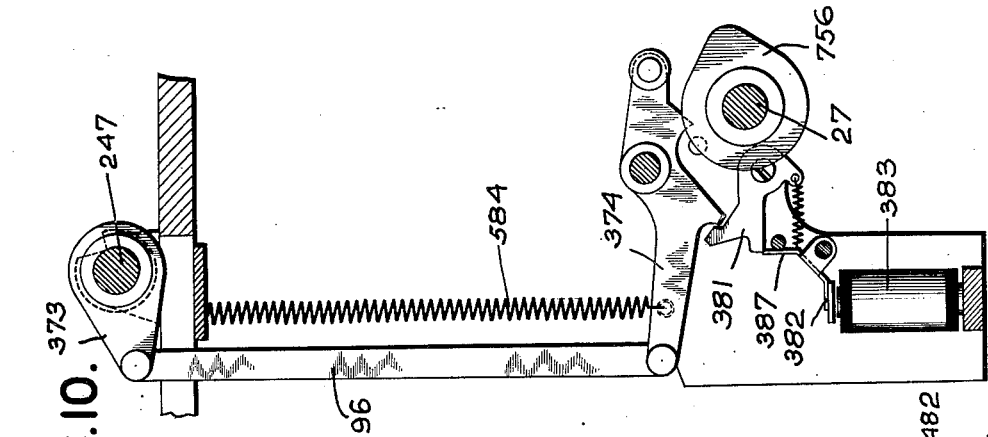
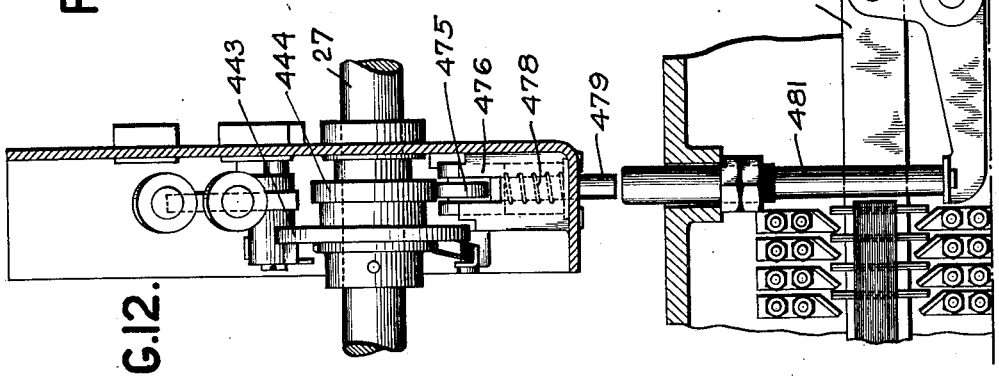
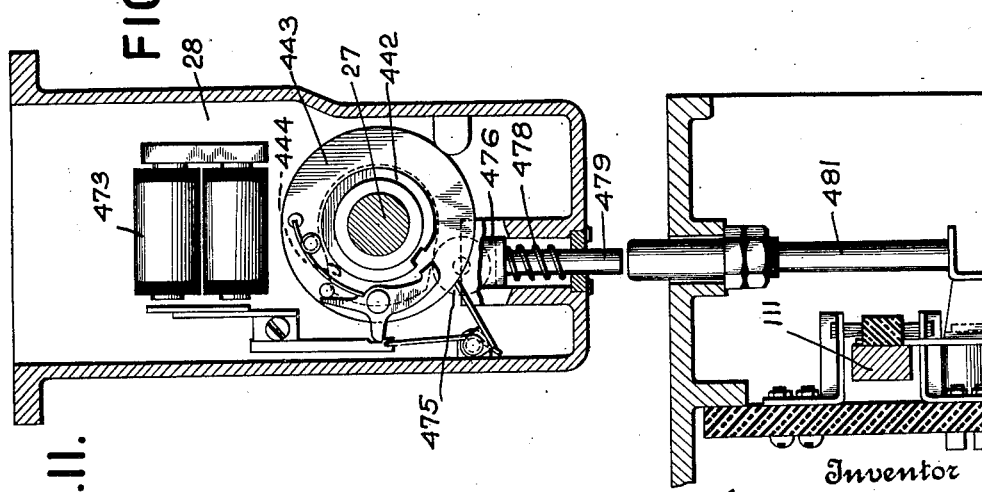

Dec. 12, 1933.  F. M. CARROLL  1,939,040
SPLIT AUTOMATIC CONTROL SYSTEM
Filed Oct. 25, 1927  8 Sheets-Sheet 8

Inventor
Fred M. Carroll
By his Attorney
W. M. Wilson

Patented Dec. 12, 1933

1,939,040

UNITED STATES PATENT OFFICE 1,939,040

SPLIT AUTOMATIC CONTROL SYSTEM

Fred M. Carroll, Yonkers, N. Y., assignor, by mesne assignments, to International Business Machines Corporation, New York, N. Y., a corporation of New York Application October 25, 1927. Serial No. 228,522

14 Claims. (Cl. 235—92)

The invention concerns a split automatic control system for record controlled machines.

The machines with which the invention is particularly concerned are of the tabulator type which operate upon cards bearing index points with distinctive characteristics for denoting different data. The most common form of index points consists of perforations differentially located on the record. The present description, with a view to clarity and brevity, will be confined to a machine for operating upon records designating numerical data in which each figure of a number is represented by a single index point which may be located in different positions to represent the digits, although it will be understood that the invention is adaptable to other systems.

Tabulators of the automatically controlled type operate upon successive cards to accumulate desired data recorded thereon and are maintained in operation as long as certain classification data on successive records agree. As soon as the classification data on successive records do not agree the machine either comes to a stop or automatically takes a total from the accumulators. The cards are ordinarily arranged in groups, all cards of one classification being together, so that under automatic operation the machine accumulates desired data from each group and takes a total at the end of each group, after which accumulating on the following group is initiated.

It is sometimes desirable to split the control data into several parts and correlate certain accumulators with each part so that a change in classification data in any one part will result in total taking only from the accumulators which are correlated to that part. A simple example of such an arrangement presents itself in connection with daily sales records wherein a perforated tabulating card is made out for each sale. Certain columns on the cards are set aside for the day, month and year, which comprise the classification data, and the amount of the sale is entered in other card columns. When the card file is run through a tabulator it may be desirable to take totals of each day's sales, totals for each month's sales and totals of each year's sales. The amount represented on each card may be entered simultaneously into three separate accumulators from one of which the daily totals may be taken, from another of which the monthly totals may be taken and from the third of which the yearly totals may be taken. When the classification number representing the day changes the machine will perform a total taking operation, but only those accumulators corresponding to the day classification will be affected, that is they will print their total. The month and year accumulators will not be affected and will continue to accumulate the amounts on the succeeding card groups until the montly or yearly classification number changes in which case they also will take a total. In this particular case the same amount is entered from each card into each of the accumulators but this, of course, is not essential as the system would work equally well in cases where there was no logical relationship at all between the several parts of the control, in which case each part of the control would operate to call its associated accumulators for totaling without affecting those associated with the other parts of the control. The arrangement under the present invention is such that each accumulator operating under the several sections of the automatic control may selectively clear or retain its total on a change in its particular control section.

The invention in its preferred form contemplates using an electromagnetically controlled switch bar for each part into which the control is to be divided, the purpose of the switch bar being to connect a particular group of accumulators to the total taking mechanism. The circuits are arranged so that no accumulator will print a total unless the switch bar with which it is associated moves to circuit closing position during a totaling operation. Each part of the automatic control is wired to an electromagnet controlling one switch bar and the automatic control circuit includes a plurality of series contacts equal in number to the controlling switch bars. When a change occurs in any part of the control system one or more of these serially connected contacts are opened to interrupt the accumulating operation and to set the machine for totaling or cause it to automatically take a total. The switch bars previously mentioned, however, select for totaling during this operation only those accumulators which are associated with the particular part or parts of the control system in which the group change occurs.

The invention, furthermore, contemplates accumulator elements individual to denominational orders with selective switching and plugging arrangements so that any one of them may be associated with any analyzing element for accumulating operations and any one of them may be associated with the total taking mechanism through any of the several automatic control switch bars, thus permitting accumulator banks to be formed of any desired accumulating elements and permitting any such form of bank to be associated with the total taking mechanism through any one of the automatic control switch bars.

The principal object of the invention is to provide a split automatic control system of improved operation and of novel arrangement of parts.

Another object of the invention is to provide a split automatic control system of more flexible operation than those previously in use.

Another object of the invention is to provide a split automatic control system which will operate fully and satisfactorily when group changes occur simultaneously in several parts of the split control and in which any of the selected accumulator banks may selectively clear or retain their totals on a total taking operation.

Another object of the invention is to provide a split control system of such a nature that the control may be split into several successively arranged sections and in which provision is made for total taking on the several accumulator banks either solely on a change of group data in the corresponding control section or on a change in the group data in any control section of higher order.

These and other objects which will be pointed out as the description proceeds will be clear from the following detailed description which should be read in connection with the accompanying drawings in which the same reference numerals refer to the same parts through the several views and in which:

Fig. 1 is a diagrammatical representation of a complete machine according to the invention.

Figs. 2, 3 and 4 are details of mechanism for operating certain switch bars concerned in the selection of accumulators under control of the automatic control system and;

Figure 5:
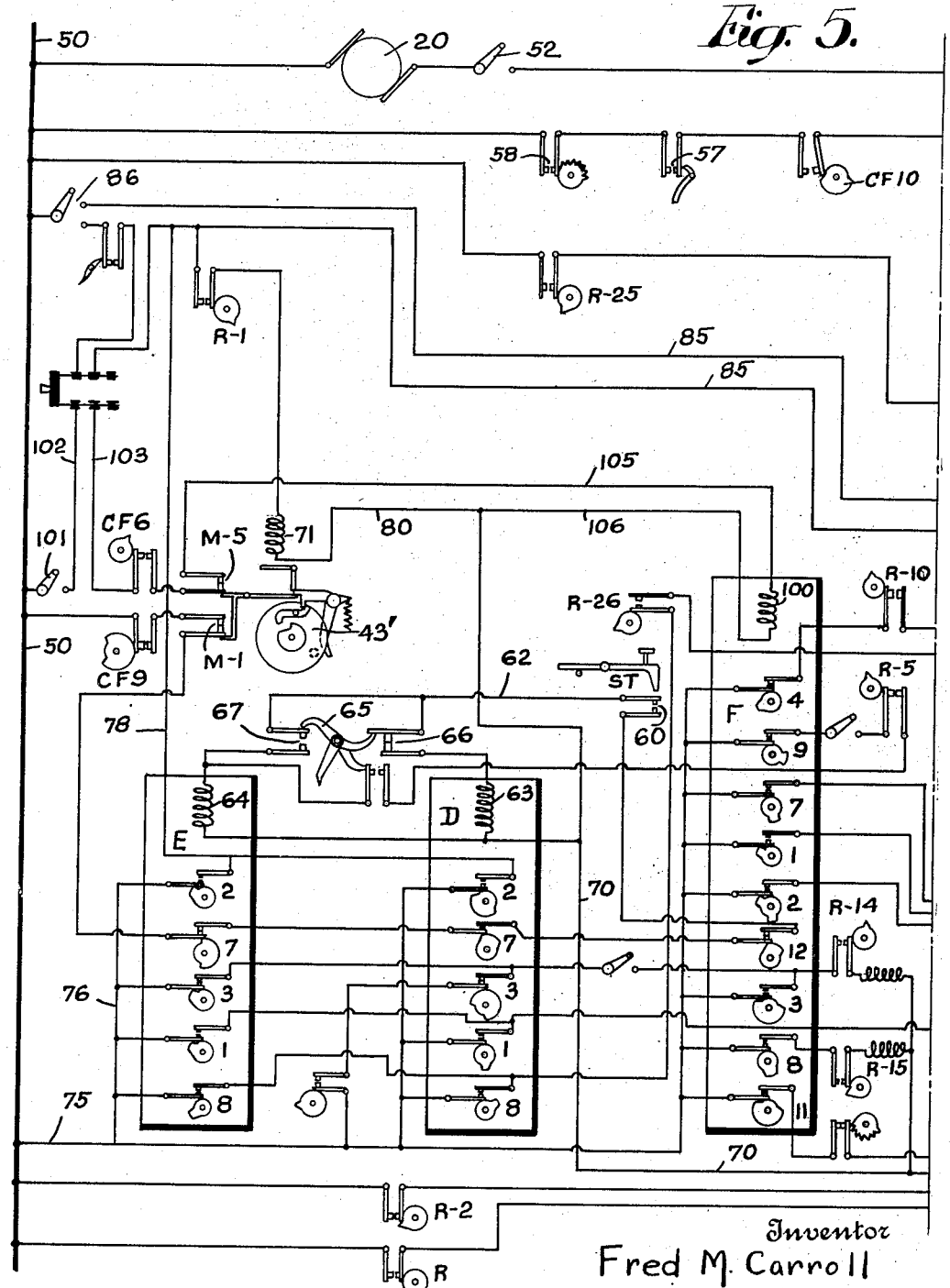

Figs. 5 and 5a form a complete circuit diagram of the machine when Fig. 5a is placed to the right of Fig. 5.

Fig. 6 is a sectional view of an accumulator unit.

Figs. 7, 8 and 9 are sections on line 7—7, 8—8 and 9—9 of Fig. 6 respectively.

Fig. 10 is a detail view of the mechanism for operating the total controlling shaft; and Figs. 11 and 12 are sectional views of the mechanism for operating the total switch bars.

Figure 13:
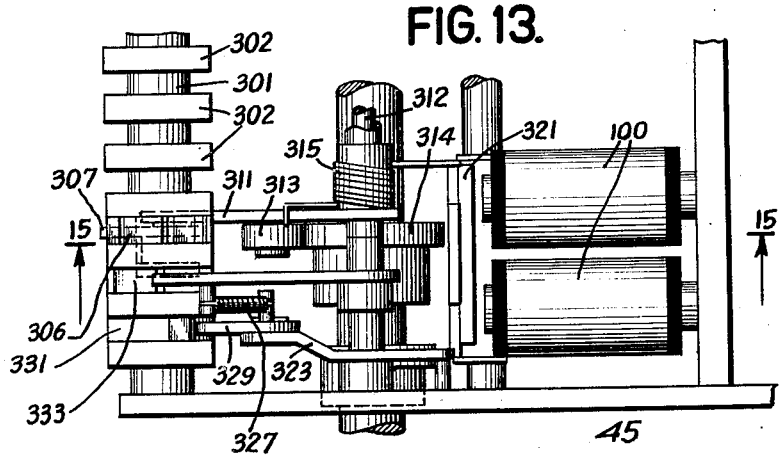
Figure 14:
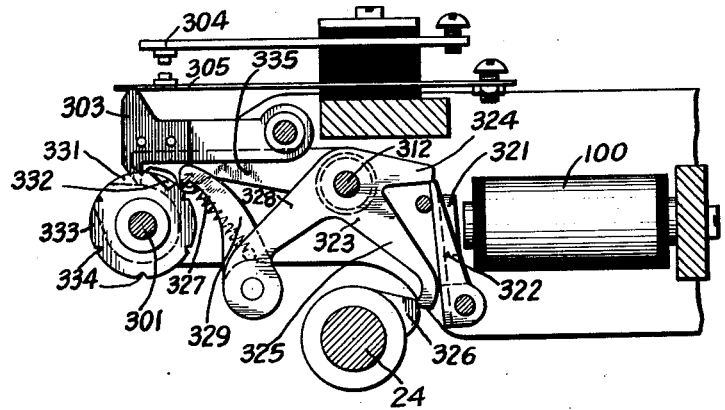
Figure 15:
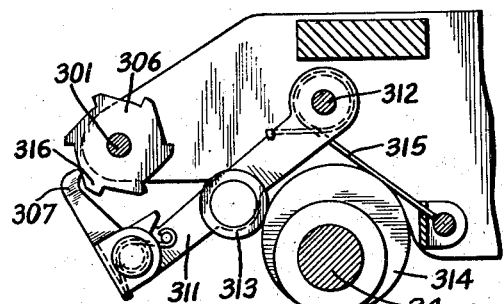

Figs. 13, 14 and 15 are detail views of the total timer.

Referring first to Fig. 1, in which a complete machine is diagrammatically illustrated, the driving motor is indicated at 20 which through a belt and pulley connection drives a gear train shown at 21. One branch of this train drives the rotary printing drum 22, another branch drives the timer shafts 23 and 24 and the accumulating shaft 25 for operating accumulators 26, while still another branch drives the constantly rotating shaft 27 on which are mounted the cams for the jacks 28 to 36, inclusive, whose function is to operate the switch bars of the machine. The card feed mechanism is indicated generally at 40 and is driven from the shaft 27 through the gear train 41. As long as the motor 20 is in operation the drum 22, the timer shafts 23 and 24, the tabulator shaft 25 and the shaft 27 rotate constantly. The card feed shaft 42 is driven from the gear train 41 through an electromagnetically operated one revolution clutch indicated generally at 43′ so that the card feed may be operative at selected times and inoperative at other times while the motor is operating. With the exception of the jacks 31, 32 and 33 which control the automatic control switch bars referred to above, and which will be described in detail hereinafter, the machine elements in structure and operation are substantially similar to those in my copending application Serial No. 147,960 filed November 12, 1926 (now Patent 1,750,459, dated May 11, 1930) to which reference may be had for a complete explanation. In the present case the explanation will be confined to what is necessary for an understanding of the present invention.

The timers 43 and 44 are known as the starting timers and consist of a series of contacts which are closed by cams in a predetermined sequence, serving to maintain the machine in operation on starting through a plurality of cycles until the automatic control system becomes operative whereupon the starting timers cease operation. The total timer 45 likewise consists of a series of cam controlled contacts which close in a selected sequence during total taking operations and whose function is to control the machine operation during total taking. The jacks 28, 29, 30, 34, 35 and 36 each control a switch bar whose function is to connect and disconnect certain elements of the machine from their controls at proper times. These jacks consist generally of cams which move their switch bars to circuit closing position and they may be operated either by cams alone, in which case they move to circuit closing position every machine cycle unless positively locked out, or they may be controlled by magnets, energization of which is necessary before the bars will move to circuit closing position.

The operation of these several elements will be clearer from a consideration of the circuit diagram in Figs. 5 and 5a. The power for driving and operating the machine is supplied from lines 50 and 51 between which the motor 20 is connected through a manually operated switch 52. Closure of this switch causes the motor to operate and drive the constantly rotating elements as explained in connection with Fig. 1. The upper or control brushes of the machine are indicated at 53 and the lower or adding brushes at 54, the former cooperating with a cylinder 55 connected directly to the line 51 and the latter cooperating with a cylinder 56 connected to the line 50 through card feed contact CF10, a pair of card lever contacts 57, which in the well known manner are closed only when cards are under the lower brushes, and contacts 58 closed instantaneously for each index point position by a coacting star wheel.

The machine may be started in operation by depressing the start key ST to close contacts 60. The closure of these contacts establishes a circuit from the line 50 through card feed contacts CF9, card feed clutch contacts M1 and timer contacts E7, D7 and F12 to the start contacts 60, thence through line 62 to either the D or E starting coil 63 or 64 depending on the position of the upper card lever 65. With no card under the upper brushes this lever is in the position shown in the drawings closing contacts 66 and opening contacts 67, in which case the circuit will continue to the D timer starting coil 63, and be completed to the other side of the line 51 through the common return 70. With a card under the upper brushes, the lever 65 is shifted to close the contacts 67 and open the contacts 66, in which case the closure of the start contacts 60 will energize the magnet 64 of the E timer through a similar circuit. Either timer operates through a plurality of cycles and through its associated contacts serves to keep the machine in operation until the first card of the group feeds to the lower brushes, after which the control is assumed by the automatic control system.

Card feed is effected through the card feed clutch 43' controlled by the magnet 71, energization of this magnet in the usual manner causing the one revolution clutch 43' to engage and feed the cards successively past the upper and lower brushes. On the operation of the D or E timer a circuit for the card feed clutch magnet 71 is established from the line 50 through wires 75 and 76 and either through the contacts E2 or D2 (which are closed during the early portion of the operation of the respective timers) to the wire 78, thence through regular cam contacts R—1, closed once each machine cycle) to the card feed clutch magnet 71 and through wire 80 and common return 70 to the other side of the line 51. Energization of the magnet 71 causes the cards to feed until the first card comes under the lower brushes. The two timers are necessary because in some cases the machine is started with a card under the upper brushes, and in other cases is started with no card under the upper brushes, the first card to be tabulated being still in the card magazine. Either timer, as will be explained later, maintains its respective contacts E—2 or D—2 closed for a plurality of machine cycles and then causes them to open. Just before they open, the circuit for the clutch magnet 71 is shifted to the auto control circuit 85. The circuit then extends from line 50 through switch 86, which should be closed for automatic control, through the automatic control circuit 85 to the cam contacts R—1, thence to the card feed clutch magnet 71 and to the other side of the line as before. As long as the control circuit 85 is established at the proper time in each cycle, which will be the case as long as the controlling or classification perforations in the cards under the upper and lower brushes agree, the card feed clutch magnet 71 is energized at the proper time in each cycle to maintain the card feed clutch in operation during the following machine cycle and card feed continues.

A plurality of accumulating elements is shown at 90, each provided with a counter magnet 91 which is connected to an individual triple socket 92 on the main switchboard. Each accumulator is also provided with totaling contacts 93, one of which is connected through the total print switch bar 94 to sockets 95 and the other of which is connected to the line 50 through cam contacts on the total timer, which is designated by the letter F. The lower brushes 54 are connected to sockets 97 from which they may be plugged through the adding and listing switch bar 98 to the sockets 92 which are connected with the counter magnets of the accumulator elements. The adding and listing switch bar automatically closes during each accumulating cycle and the data on the cards are thereupon properly entered into the accumulators 90. This accumulating continues until the auto control circuit 85 fails to close owing to a change in card group, whereupon the card feed clutch magnet 71 fails to energize permitting the elements of clutch 43' to disengage and interrupt card feed. The disengagement of the clutch 43' causes contacts M5 to close, whereupon the starter magnet 100 of the total timer F is energized through a circuit extending as follows: from the line 50 through switch 101, closed for automatic totaling, thence through wires 102 and 103 to cam contacts CF6 and through contacts M5 and wire 105 to F timer starter magnet 100 and through wire 106 and common return 70 to the other side of the line 51. The total timer thereupon starts in operation and closes its contacts in sequence to control the machine through a plurality of total taking cycles.

The operation of the accumulating units may be understood from Figs. 6, 7, 8 and 9. The tabulating shaft 25 carries a bevel gear 211 meshing with a bevel pinion 213. The pinion 213 is fixed to a shaft 215, which of course, rotates as long as the driving motor is operating. A tubular member 223 is pinned to the shaft 215 and is provided with clutch teeth on its enlarged end face. Freely mounted on the shaft 215 is a sleeve 227 comprising the counter element of the unit and having clutch teeth on its enlarged end face adapted to coact with the clutch teeth on the tubular member 223. The sleeve 227 is free to slide on the shaft and is normally urged to clutch engaging position by a pivoted shift lever 250 biased by spring 242, this spring being tensioned during tabulating operations by a double arm lever 248, having one arm forcing a struck up extension on lever 246 against the spring and the other arm resting against the edge of a notch in rock shaft 247. A latch 258 normally engages an arm of the shift lever 250 and prevents engagement of the clutch elements. The entry of an item into the unit is initiated by momentary energization of the magnet 91 which attracts its armature 252 and forces an arm 254, mounted on the pivoted armature support, against a tail piece of the latch 258, thereby rocking the latter free from its engagement with the shift lever 250. The shift lever thereupon, under the action of spring 242, shifts the counter element 227 and causes its clutch teeth to engage those on the tubular member 223. The counter element 227 then rotates with the tubular member 223 and the shaft 215 until, at a fixed point in the cycle, a projection on the tubular member 223 strikes a cam projection 261 on shift lever 250 and cams the latter to disengage the clutch elements. When the lever 250 is thus cammed out, the latch 258 again slips into latching engagement with it and holds the clutch elements out of engagement until the magnet 91 is again energized. The operation of the driving mechanism for the adder element is so synchronized with the card feed that the rotational movement of the counter element 227 registers the item represented by the index point on the card.

When one or a plurality of items have been accumulated on the counter element 227, the result or the amount standing on the counter element at any time may be printed. This totaling operation with the present machine may either clear the counter, restoring it to its zero or home position, or permit the total which is printed to remain on the counter. If the printed total is to be retained on the counter element, the notched shaft 247 remains in the position shown in Fig. 6, constantly tensioning the spring 242 through the lever 248. Totaling is initiated by energizing the counter magnet 91 which, through its armature 252 and arm 254, trips the latch lever 258 and allows the shift lever 250 to effect engagement of the counter clutch elements as previously explained. In this case the energization of the magnet 91 is so timed that the counter element 227 moves exactly 10 tooth spaces or points thereby causing it to pass through its zero position and reenter the amount originally standing on it. The kick-out is effected by a projection on the tubular member 223 which at the proper time engages the cam projection 261 on the lever rocking it against the action of spring 242 and permitting latch 258 to again engage the lever 250.

Total printing is initiated as the counter element passes through its zero position. The counter element 227 has elongated gear 271 formed on its end which meshes with a crown gear 272 (Fig. 8) formed on the rear face of disc 273. As the counter element rotates the disc also rotates. The disc is provided with a plurality of cam projections 275 (Fig. 6) and the gear ratio is such that the disc rotates through the angular distance between adjacent projections when the counter element moves ten points. Just before the counter element 227 reaches zero position, one of the projections 275 engages projection 352 on a pivoted lever 384 and cams the lever upwardly, causing a bridging contact 347 to bridge printing control contacts 93 mounted in the insulating block 209. The bridging of these contacts closes a printing control circuit and energizes a printing magnet to select a type for printing corresponding to the item originally standing on the counter element 227, the movement of the type carrying elements being adjusted to the movement of the accumulating mechanism for this purpose.

When it is desired to clear the counter element on a total printing operation, the actual printing is effected in the manner just described, but in this case provision is made for disengaging the clutch elements of the counter when it reaches zero position. For this operation the notched shaft 247 is rocked clockwise so that the lever 248 no longer tensions the spring 242. The spring, for the time being, is tensioned by the lever 246 which is held in spring tensioning position by an arm 277 integral with lever 281. The operation is initiated as previously by energizing the magnet 91 which permits shifting of the shift lever 250 causing engagement of the counter clutch elements. When the counter element reaches zero position, a projection 275 on the disc 273 engages the cam surfaces 284 on the end of lever 281 and rotates the latter clockwise, removing the arm 277 from beneath the lever 246. This relieves the tension on the spring 242 which straightens and forces the struck-up extension on lever 246 against an arm 391 on the shift lever 150, shifting the latter to unclutch the counter element from the driving mechanism just as it reaches zero position; in other words, printing the total which originally stood on it and resetting it to zero.

The device for rocking the notched shaft 247 to the total with reset position is illustrated in Fig. 10. A link 296 is pivoted at one end to an arm 373 fixed to the shaft 247 and at the other end to a lever 374. A spring 584 tends to constantly raise the link 96 and rock the shaft 247 to the total-with-reset position. The arm 374, however, is normally latched by a pivoted latch 381 held in latching position by an extension 387 carried on the supporting structure of an armature 382 for the magnet 383. Energization of the magnet attracts its armature and releases the latch, whereupon the spring 584 raises the link 296 and rocks the notched shaft 247 to the total-with-reset position. At the end of the cycle a cam 756 on the cam shaft 27 rocks the lever 374 permitting it to be relatched by the latch 381. This lowers the link 296 and restores the shaft 247 to its normal tabulating position where it remains until the magnet 383 is re-energized.

The operation of the switch bars controlled by jacks 28 to 33 is illustrated in Figs. 11 and 12. The mechanism therein illustrated is substantially that used for selecting accumulators 80 for totaling with reset or totaling without reset, the only difference in these two mechanisms residing in the fact that their switch bars move to circuit closing position during different machine cycles during the total taking operation as controlled by the total timer. The bar 111 is urged into open circuit position by a suitable spring (not shown) but may be moved into closed circuit position by mechanism which will now be described. One arm of a bell crank 482 is pivoted to the end of the switch bar and its other arm is pivoted to a vertical rod 481. Directly above the upper end of rod 481 is the shank 479 of a member 476, which is suitably guided for vertical motion and urged upward by a spring 478 surrounding the shank. The member 476 is provided with upwardly extending ears between which is pivoted a cam follower or roll 475. This cam follower coacts with a cam 444 loosely mounted on the cam shaft 27 and rigidly attached to a disc 443 which forms one element of a one revolution clutch. The other element of the clutch consists of a notched disc 442 pinned to the shaft 27. Energization of the magnet 473, under control of the total timer, causes the clutch elements to engage for a single revolution in the well known manner and causes the cam 444 to rotate. The high portion of the cam thereupon depresses the member 476 against the action of the spring 478, and the shank 479 depresses the rod 481 and rocks the bell crank 482, forcing the switch bar 111 into circuit closing position. Later in the cycle the cam follower 475 rides to the lower portion of the cam, and bar 111 again moves to open circuit position and remains there until the magnet 473 is again energized.

In addition to the switch bars previously provided, the present machine has three additional ones indicated at 113, 114 and 115 respectively, which are controlled by jacks 31, 32 and 33 (Fig. 1) which in turn are controlled through magnets 116, 117 and 118 (Fig. 5a). These switch bars are each provided with a plurality of bridging contacts which serve, when the bars are moved to circuit closing position, to bridge a plurality of sockets through which any selected accumulator units 90 may be connected to the total-and-reset switch bar 111 or the total-without-reset switch bar 112. It will be understood that during a total taking operation the contacts of the switch bars 111 or 112, as the case may be, and a selected one of the control switch bars 113, 114 or 115 will be in series with each accumulator, so that both bars must move to circuit closing position in order that the accumulators may print a total. Before explaining the circuits for controlling the control switch bars 113, 114 and 115, the operation of the bars will be explained in connection with Figs. 2, 3 and 4 of the drawings.

Referring to Figs. 2 and 3, the switch bar 113 is provided with a plurality of bridging contacts 120 which cooperate with stationary contacts 121 and 122 to which the sockets previously referred to are connected. The switch bar is normally held in open circuit position by a suitable spring (not shown). One end of the switch bar is pivotally connected to one arm of a bell crank 121' whose other arm is provided with an extension 122' on which rests an operating rod 123. The upper end of the operating rod coacts with a depressible member consisting of a shank 124 carrying a cam follower roll 125 at its upper end, and normally pressed upwardly by a spring 126. Depression of this member causes its shank 124 to depress the operating rod 123, whereupon the bell crank 121' is rocked counterclockwise moving the switch bar 113 into circuit closing position. The cam follower 125 cooperates with a cam operated by a one revolution clutch. The constantly rotating shaft 27 (see Fig. 1) extends through the jack casing and has keyed to it (Fig. 2) a notched disc 128 comprising the driving member of the clutch. The driven member of the clutch consists of a disc 129 fixed to a sleeve free on the shaft 27, which sleeve likewise carries the cam 130 for operating the cam follower 125 and a cam 133 for controlling contacts 132 whose purpose will be explained later.

The clutch disc 129 is provided with a pivoted pawl 134 which has a nose piece constantly urged by a spring by a spring 135 to engage the periphery of disc 128. This engaging action is normally prevented by a latch 136 spring-pressed to engage a tail piece on the pawl 134 and rock it against the action of the spring 135 away from the disc 128. When the pawl is released by the latch 136 its nose engages in the notch of disc 128, whereupon the disc 129 and the cams 130 and 133 rotate with the shaft 127, and during the revolution the cam follower 125 with its attached shank 124 is depressed operating the bell crank 121' to force the switch bar 113 to circuit closing position during a cycle of operation.

The latch 136 is released, when necessary, by mechanism controlled by the magnet 116. This mechanism (see Fig. 4) consists of an oscillatory hook member 138 having an upwardly extending hook 139 at one end and a downwardly extending hook 140 at the other end. The member is pivoted near its center to one arm of a lever 141 which in turn is pivoted on a stud 142 on the jack casing. The lever 141 has a second arm whose end is connected to one end of the member 138 by the spring 194 and has a third arm coacting with a cam 131 pinned to shaft 27. The position of parts when the machine is not operating is as shown in Fig. 4 with the hook 140 engaging a latch plate 143 on the jack casing. The magnet 116 is provided with an armature 144 pivoted at 145 and having an arm 146 extending under the member 138. When the machine starts in operation the magnet is first energized to attract its armature whereupon arm 146 rocks, and raises the hook end 140 of the member 138 releasing it from the latch plate 143. The spring 194 then rocks lever 141 clockwise shifting member 138 to the right as viewed in Fig. 4. Once each cycle an extension 189 on cam 131 engages the lower arm of lever 141 rocking it counterclockwise and shifting member 138 back to the left. The member 138 thus shifts to right and left once each machine cycle, and if the magnet 116 is not energized at the proper time during the cycle the hook end 139 engages an extension 150 on the pivoted latch 136 and rocks the latter about its pivot 151, causing it to release the tail piece of the pawl 134. Incidentally the hook end 140 of member 138 reengages latch plate 143. If the magnet 116 is energized at the proper time in each cycle, however, the extension 146 on its armature rocks the member 138 about its pivot lowering the end provided with the hook 139 to prevent the hook from engaging the piece 150, and raising the end provided with hook 140 to prevent its engagement with latch plate 143. In this case the member 138 oscillates idly without tripping the latch 136. In other words it is necessary that the magnet 116 be energized once each cycle to prevent the one revolution clutch from engaging. When this magnet is not energized the clutch engages and the disc 129 together with cam 130 rotates to depress the operating rod of switch bar 113 to force it to circuit closing position. Also the hook 140 reengages the latch plate 143. Toward the end of this cycle the raised portion of cam 133 engages a bell crank 152 carrying an insulated piece 153 cooperating with spring contacts 132. The rocking of this bell crank closes these contacts to prepare an auxiliary circuit for the magnet 116 whose purpose will be explained later.

Referring again to the circuit diagram, the automatic control system includes relays 87 each of which may be plugged in series between corresponding upper and lower analyzing brushes to associate them with any desired card columns. Each of the upper analyzing brushes is wired to an individual socket 502, and each of the lower analyzing brushes, which is adapted for automatic control, is wired to an individual socket 503. The two ends of each relay coil 87 are connected, respectively, to socket 504 and 505. Thus, any relay coil may be connected to control from any desired card column by plugging from upper brush socket 502 to relay socket 504, and from relay socket 505 to corresponding lower brush socket 503. This places the relay coil in series with corresponding upper and lower analyzing brushes. Each of the relays 87 is shown, in Fig. 5a, plugged between an upper analyzing brush and a corresponding lower analyzing brush. These relays 87 are of the usual automatic control type having contacts 88 which, when closed during a machine cycle, remain closed until towards the end of the cycle. When control perforations in the selected card columns agree on cards under the upper and lower brushes all the relays 87 which have been plugged for control are energized at some time in the cycle to close their contacts 88. Each pair of contacts 88 terminates in sockets 506 and 507 through which any number of them may be plugged in series. If straight automatic control is desired the selected contacts may all be connected in series in the automatic control circuit 85 in the usual manner, this being done by plugging the extreme left hand socket 506 and the extreme right hand socket 507 to the automatic control circuit, and plugging each of the other sockets 506 to an adjacent socket 507.

The control system in the present machine is designed to be split into three sections or into any number of sections less than three. Obviously the same principles could be applied to provide for more or less than a maximum of three splits. Three auxiliary relays 156, 157 and 158 of the automatic control type are provided, any or all of whose contacts 162, 163 and 164, respectively, may be plugged in series in the automatic control circuit 85. Each of the relays 156, 157 and 158 is connected in series with an individual jack magnet 116, 117 and 118, respectively, one end of each series connection being connected to main line 51 and the other end to individual sockets 159, 160 and 161 on the control panel. Three additional sockets 165, 166 and 167 on the panel are connected direct to main line 50 through cam contact R25. Any number of contacts 88 may be plugged in series between sockets 165 and 159 to control relay 156 and jack magnet 116 of switch bar 113 to form one section of split control, and other contacts 88 may be plugged between sockets 166—160 and 167—161 to form additional sections. In the present case, plugging has been indicated for two card columns in each section, the plugging being indicated by small arrows touching the sockets and joined by wavy lines. It will be noted that the contacts 88 of the two relays 87 on the left have been plugged in series with each other between sockets 159 and 165; that is, a plug connection is inserted between socket 165 and socket 506 on the extreme left; another plug connection is inserted between socket 507 of the relay contacts 88 on the extreme left and socket 506 of the second relay contacts 88 from the left; and a third plug connection has been inserted between socket 159 and socket 507 of the second relay contacts 88 from the left. Contacts 88 of the two center relays 87 have been similarly plugged in series between sockets 160 and 166, and contacts 88 of the two relays on the right have been plugged in series between sockets 161 and 167. Once each machine cycle sockets 165, 166 and 167 are energized for a brief period through cam contacts R—25 and if contacts 88 have closed during the cycle, denoting cards of like classification under the upper and lower brushes, a circuit will be completed through each relay 156, 157 and 158 and each jack magnet 116, 117 and 118. The circuit for relay 158 and jack magnet 118 extends as follows: from line 50, through cam contacts R—25 to socket 167 and through relay contacts 88 of the two relays to the right, thence to socket 161 and through relay coil 158 and jack magnet 118 to line 51. The energization of relays 156, 157 and 158 serves to close contacts 162, 163 and 164 to complete the automatic control circuit at the proper time to continue card feed during the following machine cycle, and the energization of jack magnets 116, 117 and 118 prevents engagement of the clutches of the switch bars 113, 114 and 115 maintaining the latter in open circuit position. This energization of the jack magnets, owing to the configuration of the cam R—25, persists long enough to prevent hook 140 from engaging latch plate 143 and hook 139 from engaging extension 150 (Fig. 4).

The accumulating elements 90, which have their counter magnets 91 connected to sockets 92, are shown as plugged from their sockets 92 to sockets 512. The sockets 512 are electrically connected to contacts 513, which are bridged to contacts 515 by conducting elements 514 on adding and listing switch bar 98 when the latter moves to circuit closing position. The contacts 515 are electrically connected to sockets 516, and plug connections are shown from these sockets to sockets 97 which are connected to the lower adding brushes 54. The accumulating elements are thus connected, through circuits including selective plugging devices, to the lower adding brushes through adding and listing switch bar 98, so that data on the cards analyzed by the adding brushes may be entered into them. The upper two accumulators are also connected by circuits including plugging cords, from their counter magnet sockets 92 through the control switch bar 113 to the total-and-reset switch bar 111 thus forming an accumulating bank for totaling with reset under control of the split control section including the left hand two pairs of contacts 88. The middle accumulator is similarly connected from its socket 92 through the control switch bar 114 to total-and-reset bar 111 and the lower two accumulators are connected in similar manner by circuits including plug cords, through the control switch bar 115. Thus the plugging, as indicated, provides for three accumulating banks each under control of a section of the split automatic control. While each bank of accumulators has been plugged in circuit through the total-and-reset switch bar, so that each will print its total and reset on a change in control data in its particular control section, it is quite practical to plug any or all of the banks in circuit through the total-without-reset switch bar 112, so that they will print totals without resetting on a change in their respective control data. The latter arrangement provides for cumulative totals.

When the machine starts in tabulating operation cam contacts D8 or E8 on the starting timers close a circuit through regular cam contacts R—26 to the jack magnets 116, 117 and 118, energizing them momentarily to release the hook members 138 (Fig. 4). The latter thereupon oscillate as explained above as long as the classification data on successive cards agree.

The total timer, as fully explained in the Patent 1,750,459 referred to above, causes the machine to make one blank cycle followed by a total-without-reset cycle in which the jack magnet of the total-without-reset switchbar 112 is energized causing this bar to move to circuit closing position, whereupon any accumulators whose counter magnets are plugged through this bar print their totals. This total-without-reset cycle is followed by another blank machine cycle, after which a total-with-reset cycle occurs during which the jack magnet of the total-with-reset switchbar 111 is energized to move this bar to circuit closing position. Each accumulator in the present case is connected by plugging through the total-and-reset bar 111 in series with one of the control switchbars 113, 114, 115, and only those accumulators will print totals and reset whose control switchbars have likewise moved to circuit closing position due to a change in control data in their particular control section.

The mechanical details of the total timer are illustrated in Figs. 13, 14 and 15. The function of this mechanism is to close and open contacts during different machine cycles to call the several total control devices into operation as necessary. The mechanism for the sake of standardizing it, is designed to operate for six machine cycles when it is once called into operation although obviously it could be made to operate more or less than six cycles if desired. The controlling contacts 304, 305 are operated through pivoted arms 303, having insulated portions to engage the lower contacts, and rocked by suitable cams 302 fixed to shaft 301. This shaft is normally stationary, but may be called into operation by instantaneous energization of magnet 100 to make a complete revolution during six machine cycles. A ratchet wheel 306 having six teeth is fixed to the end of shaft 301 (see Fig. 15). One of the teeth is elongated and a pawl 307 pivoted to arm 311 is normally in engagement with the elongated tooth. A cam 314 fixed to constantly running shaft 24 see also Fig. 1) engages a roller 313 on arm 311 and causes the arm to rock up and down, the pawl 307 sliding back and forth on the elongated tooth which is too long to permit the pawl to engage the next tooth of the ratchet wheel. A three armed lever pivoted at 312 has one arm 325 cooperating with a cam 326 on shaft 24. A spring 327 tends to make the arm 325 follow the cam surface but normally it is held in the position shown by a second arm 324 which is latched by an extension 322 on armature 321 of magnet 100. A third arm 328 carries a pivoted pawl 329 which cooperates with a notched disk 331 also fast to shaft 301. When magnet 100 is energized it attracts its armature and releases arm 324, permitting arm 325 to follow the contour of cam 326 rocking arm 328 clockwise. This advances pawl 329 causing it to engage in the notch 332 in disk 331 and when the high portion of cam 326 again engages arm 325 to rock the three arm lever counterclockwise, pawl 329 rotates shaft 301 slightly causing constantly oscillating pawl 307 (Fig. 15) to slide off the elongated tooth of the ratchet wheel 306 and engage the next tooth. Thereafter each oscillation of pawl 307 causes the ratchet wheel 306 and consequently shaft 301 to rotate one sixth of a revolution until, after a complete revolution, pawl 307 again encounters the elongated tooth whereupon the shaft 301 comes to rest and remains stationary until magnet 100 is again energized. This rotation of shaft 301 closes and opens the total timer contacts 304—305 through cams 302 as required for the necessary total control operations in the different machine cycles. The starting times D and E are entirely similar in structure and operation to the total timer just described, differing from it only in the number of contacts and the times at which they close and open.

Let it be assumed that a change of control data occurs only in that control section with which the control switchbar 113 is associated. This bar should then move to circuilt closing position for both the total-without-reset cycle and and total-with-reset cycle to permit the accumulators plugged through it to print their totals under either condition. The control switch bars 114, 115, whose control data have not changed should remain in open circuit position throughout the total taking operation.

Considering first the switchbars 114 and 115, their control circuits through jack magnets 117 and 118 have been completed during the last card feeding cycle and their oscillating members 138 (see Figs. 2, 3 and 4) have been rocked by their jack magnets to prevent release of their operating clutch pawls 134. At the end of the last card feeding cycle all contacts 88 are reopened and consequently the jack magnets 117 and 118 are not energized during the operation of the total timer. On the movement of their oscillating members 138 to the left during the last card feeding cycle, then, the hooks 140 engage latch plates 143 and hold the mechanisms inoperative with the switchbars 114, 115 in open circuit position. These conditions continue until the jack magnets 117, 118 are again energized under control of the starting timers on resumption of card feed.

The group change has occurred in the control section associated with switch bar 113, and failure of the contacts 88 in this section to close during the last card feeding cycle prevents energization of the jack magnet 116 at the end of this cycle. The oscillating member 138 (Figs. 2, 3 and 4) of this jack mechanism is thus not rocked on its movement to the right in the last card feeding cycle, and the hook 139 engages the tail piece 150 on latch member 136. On the movement of member 138 to the left under action of cam 131, the latch 136 is rocked to release pawl 134 and the hook 140 engages latch plate 143 to latch member 138. The nose of pawl 134 moves against the periphery of clutch disc 128. It will be recalled that the first machine cycle after the starting of the total timer is a blank one, and this release of the pawl 134 is so timed that the nose of the pawl encounters and enters the notch in driving disc 128 slightly before the beginning of the following machine cycle meanwhile riding on the periphery of the disc. This following cycle is the total-without-reset cycle and the jack clutch, now being engaged, effects movement of the switch bar 113 to circuit closing position. As previously explained, this permits total printing without reset under split control for any accumulators which are connected in circuit for this operation.

An additional control circuit is provided for each jack magnet 116, 117, and 118, through the total timer contacts F—4, cam contacts R—10 and one of the individual contacts 132, 175 and 176. Towards the end of the total-without-reset cycle the bell crank 152 (see Fig. 2) is rocked by cam 133 to close contacts 132 which are in the auxiliary control circuit of jack magnet 116. During this cycle also total timer contacts F—4 close, and regular contacts R—10 establish the auxiliary circuit instantaneously to energize jack magnet 116. This again releases member 138 which moves to the right and the magnet 116 is deenergized soon enough to permit the hook 139 to engage tail piece 150 of latch 136 and release clutch pawl 134. As the total-without-reset cycle is followed by another blank machine cycle this release of the pawl is timed as before to permit engagement of the clutch elements slightly before the beginning of the following cycle which is the total-with-reset cycle. For the total-with reset cycle then the switch bar 113 again moves to circuit closing position to permit totaling-with-reset from any accumulators which are connected in circuit through this bar for this operation. At the end of these totaling operations all jack mechanisms are latched as shown in Fig. 4, and can only become again operative on the initial energization of their jack magnets under control of the starting timers.

It will be clear from the foregoing explanation that the invention provides for a split control arrangement in which a change of control data in any section operates to print totals and selectively reset or not reset the associated accumulators. Furthermore, while the exemplary embodiment chosen for illustration deals with a system in which each control section operates independently of the others, it is obvious that other arrangements could be adopted. The control might be divided into major, intermediate, and minor sections so that a change in the major section would effect total taking in the intermediate as well as the minor section and a change in the intermediate section would result in the taking of intermediate as well as minor totals. This could be accomplished by plugging all contacts 88 in series and connecting sockets 159, 160 and 161 as shown in the drawings, omitting the connections from sockets 166 and 167. In this case failure of contacts 88 to make in any section would control switch bar 115; failure of contacts 88 in the intermediate or left hand section would control switch bar 114 and failure of contacts 88 in the left hand section only would control switch bar 113.

I claim:

1. A record controlled accounting machine comprising a control system divided into a plurality of sections and accumulating mechanisms associated with the several sections, means controlled by the control system for effecting totaling with clearing on certain of the accumulating mechanisms on a change in control data in their associated control sections and means controlled by the control system for effecting totaling without clearing on certain other accumulating mechanisms on a change in control data in their associated control sections.

2. A record controlled accounting machine comprising a control system divided into a plurality of sections and accumulating mechanisms associated with the several sections, means controlled by the control system for effecting totaling from the several accumulating mechanisms on a change in control data in their associated control sections and selective means for clearing or not clearing the several accumulating mechanisms on the total taking operations.

3. A record controlled accounting machine comprising a control system divided into a plurality of sections and accumulating mechanisms associated with the several sections, total-with-reset mechanism and total-without-reset mechanism and means controlled by the control system for initiating operation of the same selectively for operating upon the several accumulating mechanisms in accordance with group data changes in the several control sections.

4. A record controlled accounting machine comprising a control system divided into a plurality of sections and accumulating mechanisms associated with the several sections, total-with-reset mechanism and total-without-reset mechanism with means for initiating operation of both mechanisms on a change of group data in any section, and means controlled from the control system for connecting certain of the accumulating mechanisms with the total-with-reset mechanism on a change in control data in their respective control sections and means controlled from the control system for connecting others of the accumulating mechanisms with the total-without-reset mechanism on a change in control data in their respective control sections.

5. A record controlled accounting machine comprising a control system divided into a plurality of sections and accumulating mechanisms associated with the several sections, total-with-reset mechanism and total-without-reset mechanism with means for initiating operation of both mechanisms successively on a change of group data in any section and means controlled from the control system for connecting certain of the accumulating mechanisms with the total-with-reset mechanism and certain others with the total-without-reset mechanism during their respective operations on a change in control data in the several sections.

6. A record controlled accounting machine comprising a control system divided into a plurality of sections and accumulating mechanisms associated with the several sections, total-with-reset mechanism and total-without-reset mechanism with means controlled by the control system for initiating operation of both mechanisms on a change of control data in any section and selective means for associating any accumulating mechanism with either the total-with-reset or the total-without-reset mechanism to be operated thereby on a change of control data in its respective control section.

7. A record controlled accounting machine comprising a control system divided into a plurality of sections and accumulating mechanisms associated with the several sections, means for initiating a plurality of totaling cycles in one of which totaling with reset occurs and in another of which totaling without reset occurs on a change of control data in any section and means controlled by the several control sections for selectively operating their accumulators in the different totaling cycles.

8. A record controlled accounting machine comprising a control system divided into a plurality of sections, totaling-with-reset mechanism and totaling-without-reset mechanism and means controlled by the control system for effecting operation of said totaling-with-reset mechanism and said totaling-without-reset mechanism selectively in accordance with control data changes in the different sections.

9. A record controlled accounting machine comprising a control system divisible into a plurality of control sections, accumulating mechanism, means controlled by a change of control data in any section for initiating a total taking operation in connection with the accumulating mechanism and means controlled by the particular section in which the change occurs to determine whether the accumulating mechanism shall reset on total taking.

10. A record controlled accounting machine comprising a control system divisible into a plurality of control sections, an accounting mechanism associated with the related control section and means including selectably attachable connections for selectively arranging the control sections so that one section alone will control the related accounting mechanism or a number of control sections exceeding two will control one accounting mechanism.

11. A record controlled accounting machine comprising a control system divisible into a plurality of serially arranged control sections, a plurality of accounting mechanisms associated with the control sections and means including selectably attachable connections for selectively arranging the control sections so that one section alone will control the related accounting mechanism or so that certain sections will control a number of accounting mechanisms fixed by the position of the section in the series.

12. A record controlled accounting machine comprising a control system divisible into a plurality of serially arranged control sections, an accounting mechanism associated with each control section and means including selectably attachable connections for selectively arranging the control sections so that each of them will control the related accounting mechanism or so that certain of the sections will control a progressive number of accounting mechanisms according to the positions of the sections in the series.

13. An accounting machine comprising an electrical automatic control system divisible into sections, a control circuit for the machine including a circuit maker for each section, accumulators and total taking mechanism with switching means for operatively associating them with each other and an auxiliary control circuit for each control section, each auxiliary control circuit comprising circuit making devices operated in accordance with controlling records and electro-magnetic means for operating the circuit makers and the switching mechanism.

14. An accounting machine comprising an electrical automatic control system divisible into sections, a control circuit for the machine comprising a circuit maker for each section, accumulators and total taking mechanism successively operable to take totals with and without accumulator reset and switching mechanism for operatively associating the accumulators with the total taking mechanism, and an auxiliary control circuit for each control section, each auxiliary control circuit comprising circuit making devices operated in accordance with controlling records and electro-magnetic means for operating the circuit makers to interrupt machine operation and the switching mechanism to associate the accumulators with the total taking mechanism selectively for total taking with or without reset.

FRED M. CARROLL.